(12) United States Patent  (10) Patent No.: US 7,477,318 B2
Nakamura  (45) Date of Patent: Jan. 13, 2009

(54) MANUAL OPERATIONAL MEMBER POSITIONING ON ROTATABLE GRIP OF DIGITAL CAMERA

(75) Inventor: Yoshikazu Nakamura, Chiba (JP)

(73) Assignee: Hoya Corporation, Tokyo (JP)

( * ) Notice: Subject to any disclaimer, the term of this patent is extended or adjusted under 35 U.S.C. 154(b) by 532 days.

(21) Appl. No.: 11/052,798

(22) Filed: Feb. 9, 2005

(65) Prior Publication Data
US 2005/0174480 A1    Aug. 11, 2005

(30) Foreign Application Priority Data
Feb. 10, 2004    (JP)    ............... 2004-034026

(51) Int. Cl.
*H04N 5/225*    (2006.01)
*G03B 17/00*    (2006.01)

(52) U.S. Cl. ............ 348/376; 396/420; 396/423; 396/424

(58) Field of Classification Search ............... 348/333.01–333.11, 373–376
See application file for complete search history.

(56) References Cited

U.S. PATENT DOCUMENTS

| | | | | |
|---|---|---|---|---|
| D330,562 S | * | 10/1992 | Takada et al. | .......... D16/202 |
| 5,381,179 A | * | 1/1995 | Kashimura | .......... 348/376 |
| 5,664,243 A | * | 9/1997 | Okada et al. | .......... 396/246 |
| 5,742,341 A | * | 4/1998 | Ohishi et al. | .......... 348/373 |
| 6,226,448 B1 | | 5/2001 | Takagi et al. | |
| 6,384,863 B1 | * | 5/2002 | Bronson | .......... 348/373 |
| 6,556,240 B2 | * | 4/2003 | Oka et al. | .......... 348/211.99 |
| D520,043 S | * | 5/2006 | Kurimoto et al. | .......... D16/202 |
| 7,133,608 B1 | * | 11/2006 | Nagata et al. | .......... 396/374 |
| 7,199,832 B2 | * | 4/2007 | Oran | .......... 348/376 |
| 2004/0051811 A1 | * | 3/2004 | Nakanishi | .......... 348/375 |
| 2004/0165106 A1 | * | 8/2004 | Nakagawa | .......... 348/373 |
| 2004/0165107 A1 | * | 8/2004 | Yip | .......... 348/375 |
| 2006/0274184 A1 | * | 12/2006 | Hayashi | .......... 348/333.06 |

FOREIGN PATENT DOCUMENTS

EP    0581286    2/1994
JP    6-98210    4/1994

OTHER PUBLICATIONS

U.S. Appl. No. 11/052,791 to Kosei Kosako, which was filed on Feb. 9, 2005.

* cited by examiner

*Primary Examiner*—Ngoc-Yen T Vu
*Assistant Examiner*—Christopher K Peterson
(74) *Attorney, Agent, or Firm*—Greenblum & Bernstein, P.L.C.

(57) ABSTRACT

A digital camera capable of selectively taking still images and moving images, includes a camera body including a photographing optical system; a grip mounted to the camera body to be rotatable relative to the camera body; a first manual operational member adopted for making the digital camera take the still images; and a second manual operational member adopted for making the digital camera take the moving images. The grip includes two adjacent non-parallel surfaces, neither of which faces the camera body, the first manual operational member and the second manual operational member being provided on one and the other of the two adjacent non-parallel surfaces, respectively.

22 Claims, 11 Drawing Sheets

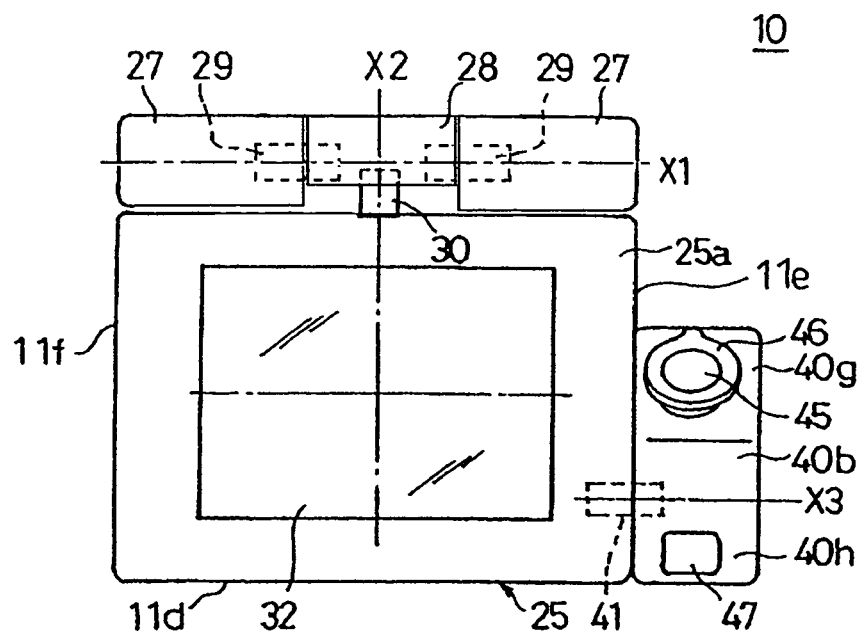
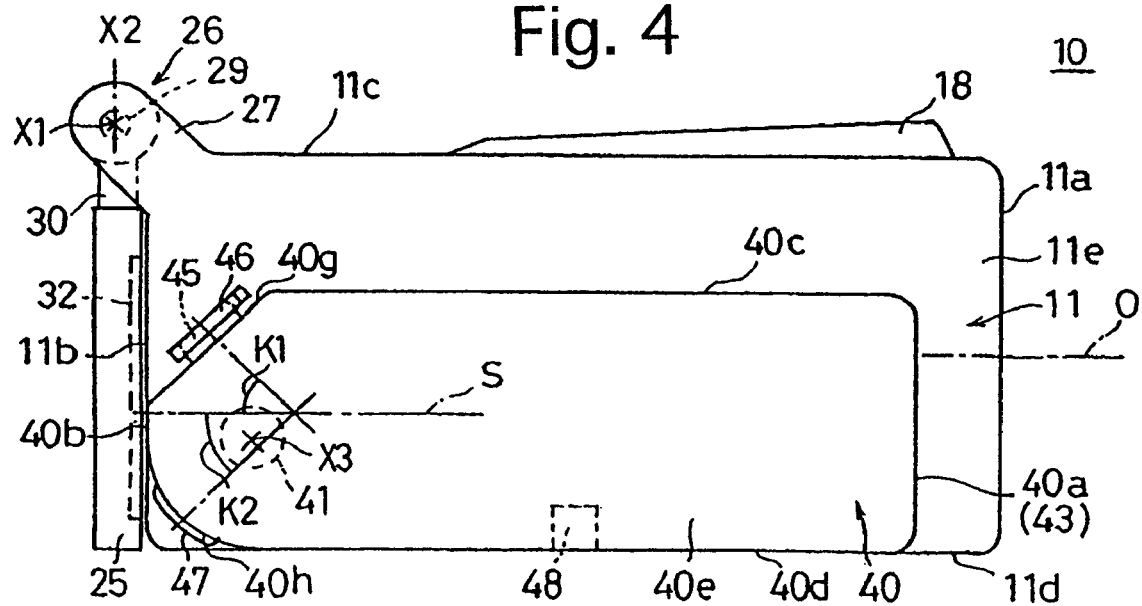

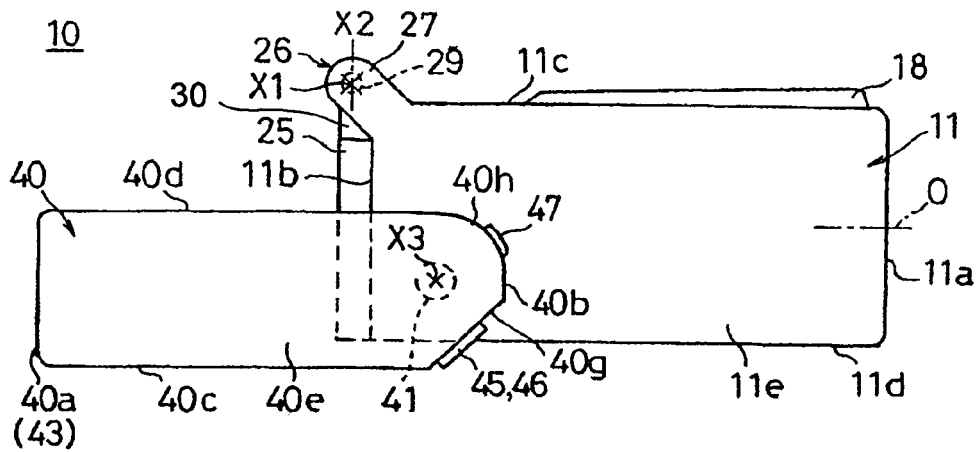
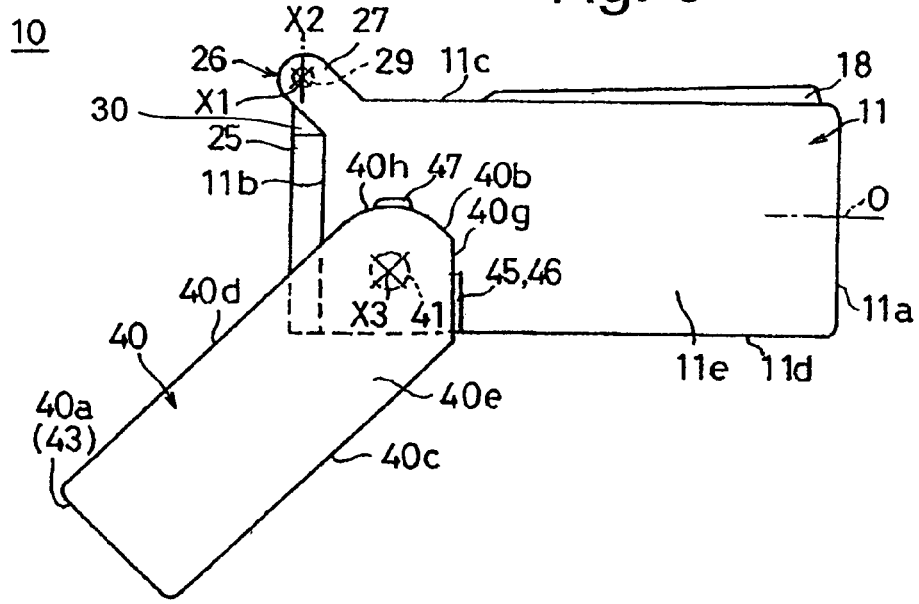
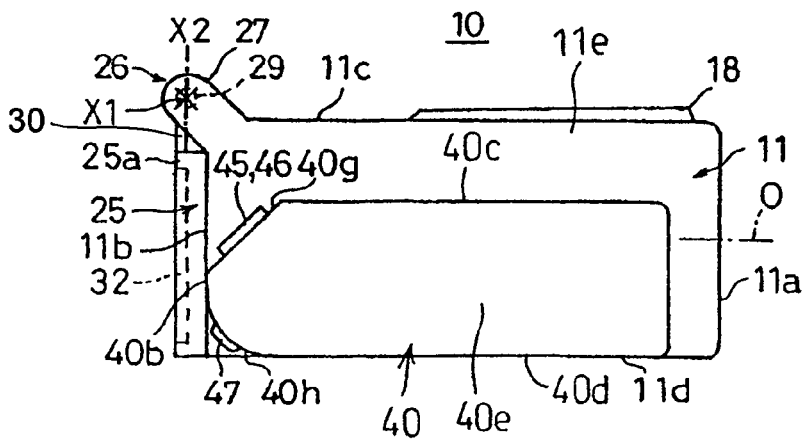

MANUAL OPERATIONAL MEMBER POSITIONING ON ROTATABLE GRIP OF DIGITAL CAMERA

BACKGROUND OF THE INVENTION

1. Field of the Invention

The present invention relates to a digital camera having a rotatable image display portion and a rotatable grip.

2. Description of the Related Art

Although some digital cameras are provided with an optical viewfinder, it is often the case that the user takes pictures with a digital camera while seeing object images on an image display portion (e.g., LCD monitor), not through the optical viewfinder, unless the digital camera is an SLR type digital camera. Accordingly, many digital cameras are required to have an operability different from the operability of a typical conventional camera using sensitive film which is generally used with the user's face being brought close to an eyepiece window (viewfinder window) of the camera body.

A digital camera in which a grip including a photographing lens is pivoted on a camera body equipped with an LCD monitor is known in the art. This type of digital camera is disclosed in, e.g., U.S. Pat. No. 6,226,448. In this type of digital camera, there are many restrictions in shooting posture of the user when they take pictures while holding the grip because the direction of the photographing optical axis depends on the orientation of the grip. The operability of some manual operational buttons (manual operational members) may deteriorate depending on the angular position of the grip. Specifically in the digital camera capable of taking not only still images but also moving images, it is desirable that a manual operational member for taking still images and another manual operational member for taking moving images be placed at easy-to-operate positions.

SUMMARY OF THE INVENTION

The present invention provides a digital camera which is excellent in operability, especially in operability of one or more manual operational members for taking images regardless of whether the images to be taken are still images or moving images.

According to an aspect of the present invention, a digital camera capable of selectively taking still images and moving images is provided, including a camera body including a photographing optical system; a grip mounted to the camera body to be rotatable relative to the camera body; a first manual operational member adopted for making the digital camera take the still images; and a second manual operational member adopted for making the digital camera take the moving images. The grip includes two adjacent non-parallel surfaces, neither of which faces the camera body, the first manual operational member and the second manual operational member being provided on one and the other of the two adjacent non-parallel surfaces, respectively.

It is desirable for the grip to include a plurality of surfaces including the two adjacent non-parallel surfaces, extending substantially parallel to a rotational axis of the grip, and surrounding the rotational axis.

It is desirable for the two adjacent non-parallel surfaces to be non-orthogonal to each other.

It is desirable for the grip to include three pairs of flat surfaces. One of the two adjacent non-parallel surfaces, on which one of the first manual operational member and the second manual operational member is provided, is non-parallel to each flat surface of the three pairs of flat surfaces.

It is desirable for the first manual operational member and the second manual operational member to be positioned on a first straight line and a second straight line which are substantially symmetrical to each other with respect to a third straight line that extends between the first manual operational member and the second manual operational member in a lengthwise direction of the grip. An angle of inclination of the first manual operational member relative to the third straight line is substantially equal to an angle of inclination of the second manual operational member relative to the third straight line.

It is desirable for the at least one of the two adjacent non-parallel surfaces, on which one of the first manual operational member and the second manual operational member is provided, be formed as a non-flat surface.

It is desirable for the non-flat surface to have an external positive curvature.

It is desirable for the grip to be elongated in a direction orthogonal to a rotational axis of the grip, wherein the rotational axis is positioned eccentric to a center of the grip in a lengthwise direction of the grip, and the first manual operational member and the second manual operational member are positioned in a vicinity of the rotational axis.

It is desirable for one of the two adjacent non-parallel surfaces, on which one of the first manual operational member and the second manual operational member is provided, to be positioned closer to the rotational axis than the other of the two adjacent nonparallel surfaces.

It is desirable for the first manual operational member and the second manual operational member to be positioned substantially on an imaginary cylindrical surface about the rotational axis.

It is desirable for an optical axis of the photographing optical system to extend linearly in a direction from a front end to a rear end of the camera body, and for a rotational axis of the grip to extend in a direction substantially orthogonal to the optical axis.

It is desirable for the camera body to include a right side surface, a left side surface, a top surface, and a bottom surface, which surround the photographing optical system, and for the grip to be mounted to one of the right side surface and the left side surface to be rotatable relative to the camera body.

It is desirable for the grip to be rotatable relative to the camera body to orient at least one of the first manual operational member and the second manual operational member toward the front of the camera body.

It is desirable for the grip to include a battery chamber, an insertion opening of which is positioned at one end of opposite ends of the grip in the lengthwise direction of the grip. The first manual operational member and the second manual operational member are provided at the other end of the opposite ends of the grip in the lengthwise direction of the grip.

The digital camera cam include a zoom switch positioned on the grip in association with the first manual operational member.

It is desirable for the grip to be pivoted about a pivot shaft which extends from a side surface of the camera body at a position on the side surface in a vicinity of a rear end of the camera body.

It is desirable for the grip to be rotatable to a specific angular position relative to the camera body so that a lengthwise direction of the grip is substantially coincident with a lengthwise direction of the camera body.

The digital camera can include an image display portion mounted to a rear end of the camera body to be rotatable relative to the camera body.

In another embodiment, a digital camera is provided, including a camera body including a photographing optical system; a grip mounted to the camera body to be rotatable relative to the camera body about a rotational axis, the grip being elongated in a direction substantially orthogonal to the rotational axis; and a manual operational member adopted for making the digital camera take images, and provided on one of opposite end surfaces of the grip in the direction substantially orthogonal to the rotational axis.

It is desirable for the rotational axis to be positioned eccentric to a center of the grip in a lengthwise direction of the grip, wherein the one of the opposite end surfaces of the grip, on which the manual operational member is provided, is closer to the rotational axis than the other of the opposite end surfaces of the grip.

It is desirable for the rotational axis to be positioned eccentric to a center of the grip in a lengthwise direction of the grip, wherein the one of the opposite end surfaces of the grip, on which the manual operational member is provided, is farther from the rotational axis than the other of the opposite end surfaces of the grip.

It is desirable for the rotational axis of the grip to extend in a direction substantially orthogonal to an optical axis of the photographing optical system.

In an embodiment, a digital camera is provided, including a camera body including a photographing optical system; a grip mounted to the camera body to be rotatable about a rotational axis extending in a direction substantially orthogonal to an optical axis of the photographing optical system; a first manual operational member which makes the digital camera take still images when depressed; and a second manual operational member which makes the digital camera take moving images when depressed. The grip includes two non-parallel surfaces which face radially outwards from the rotational axis in two different radial directions, respectively, the first manual operational member and the second manual operational member being provided on one and the other of the two adjacent non-parallel surfaces, respectively.

According to the present invention, a digital camera which is excellent in operability, especially in operability of one or more manual operational members for taking still images or moving images is achieved.

The present disclosure relates to subject matter contained in Japanese Patent Application No. 2004-34026 (filed on Feb. 10, 2004) which is expressly incorporated herein by reference in its entirety.

BRIEF DESCRIPTION OF THE DRAWINGS

The present invention will be described below in detail with reference to the accompanying drawings in which:

FIG. 3 is a rear elevational view of the digital camera shown in FIGS. 1 and 2;

FIG. 4 is a side elevational view of the digital camera shown in FIGS. 1 and 2, viewed from the grip side;

FIG. 5 is a side elevational view of the digital camera shown in FIGS. 1 and 2, showing a state in which the grip is rotated to extend rearwards from the camera body;

FIG. 6 is a side elevational view of the digital camera shown in FIGS. 1 and 2, showing a state in which the grip is rotated to extend obliquely downwards from the camera body;

FIG. 9 is a view similar to that of FIG. 4 and shows a state in which the LCD monitor panel is reversed from the position shown in FIG. 4;

DESCRIPTION OF THE PREFERRED EMBODIMENTS

Figure 1:
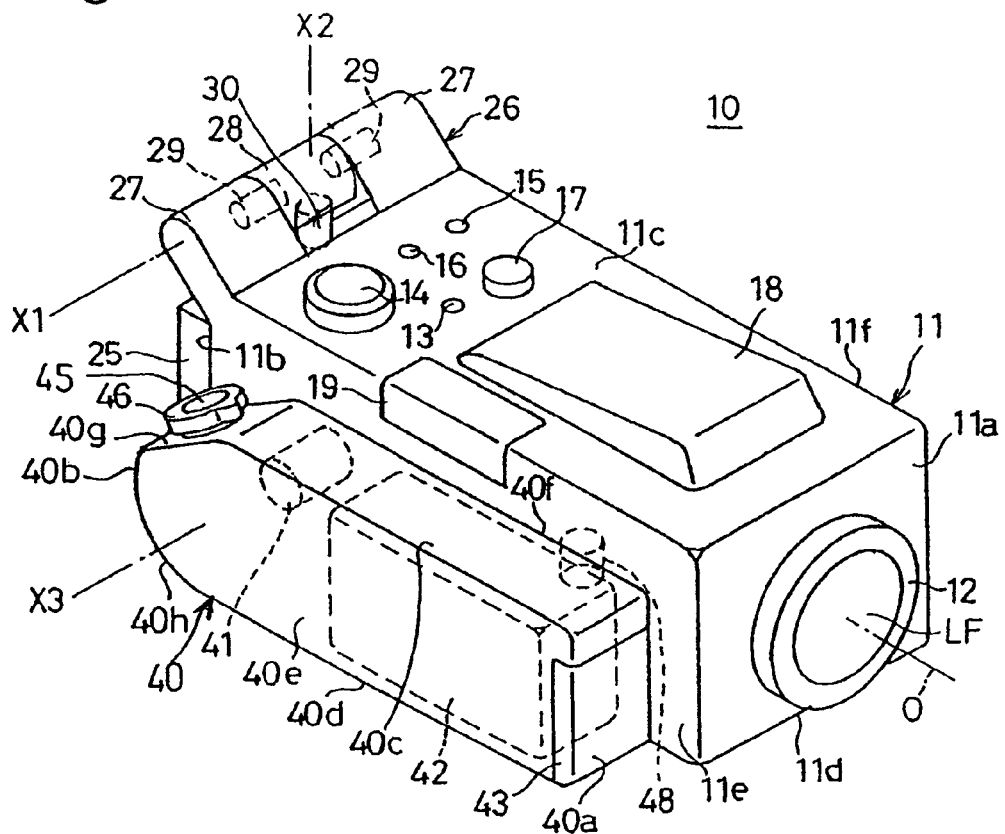
FIG. 1 is a perspective view of an embodiment of a digital camera according to the present invention.
Figure 2:
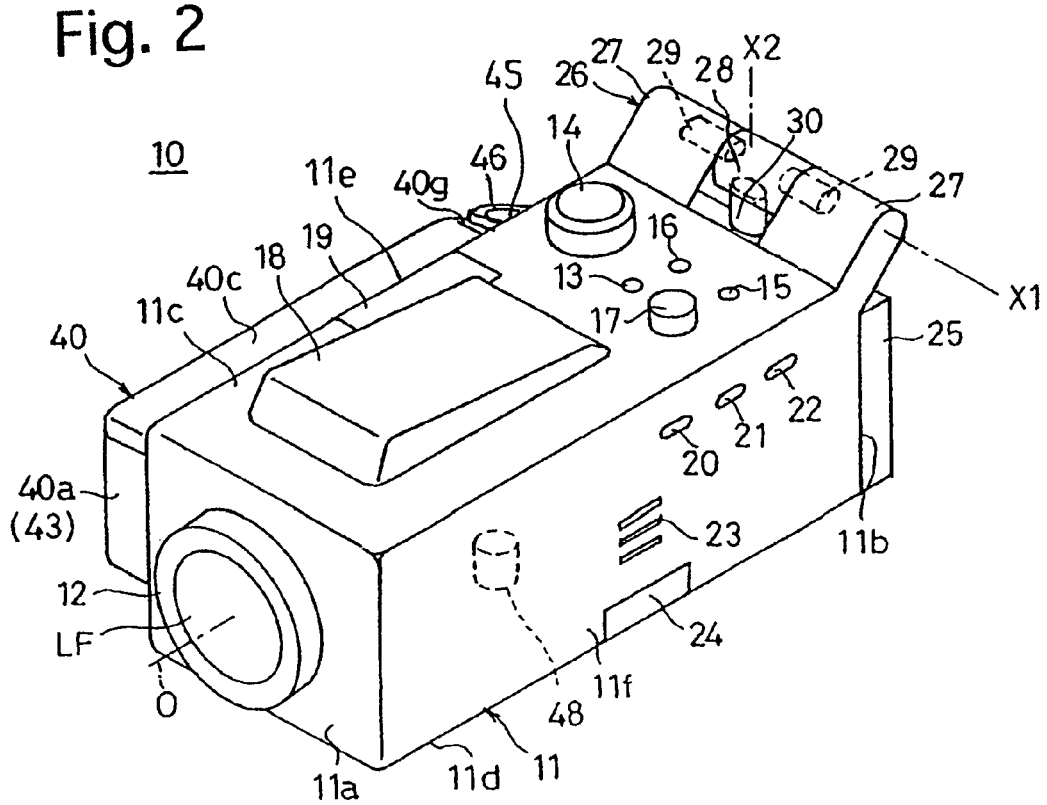
FIG. 2 is a perspective view of the digital camera shown in FIG. 1, viewed from a different angle.
Figure 7:
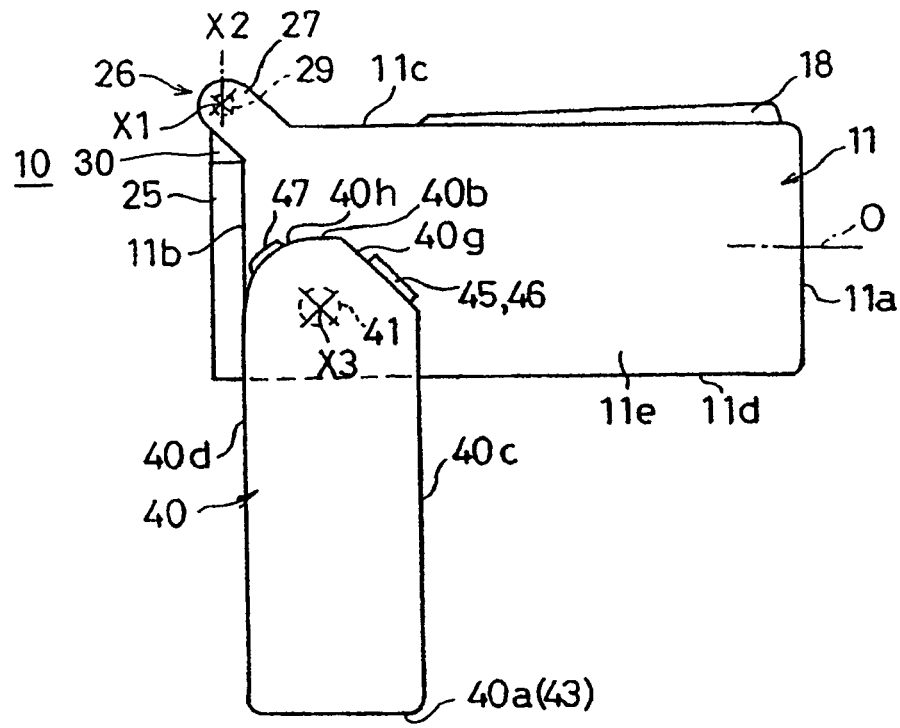
FIG. 7 is a side elevational view of the digital camera shown in FIGS. 1 and 2, showing a state in which the grip is rotated to extend downwards from the camera body.

FIGS. 1 through 12 show an embodiment of a digital camera 10 according to the present invention. The digital camera 10 is provided with a camera body 11 including a photographing optical system. The camera body 11 is formed as a substantially rectangular parallelepiped which is elongated along an optical axis O of the photographing optical system. The outer surface of the camera body 1 is composed of six surfaces: a front end surface 11a, a rear end surface 11b, a top surface 11c, a bottom surface 11d, a right side surface 11e, and a left side surface 11f. The top surface 11c, the bottom surface 11d, the right side surface 11e, and the left side surface 11f connect the front end surface 11a with the rear end surface 11b, and surround the optical axis O. In the present embodiment of the digital camera, the vertical direction and the horizontal direction of FIGS. 3, 11 and 12 correspond to the vertical direction and the horizontal direction of the digital camera 10, respectively. More specifically, the right-hand side of the digital camera 10 as viewed from the rear side thereof (as viewed from the right-hand side shown in FIG. 3) is defined as the right-hand side of the digital camera 10, while the left-hand side of the digital camera 10 as viewed from the rear side thereof is defined as the left-hand side of the digital camera 10. In addition, a direction parallel to the optical axis O is defined as a forward/rearward direction of the digital camera 10, the front end surface 11a is defined as the front side of the digital camera 10, and the rear end surface 11b is defined as the rear side of the digital camera 10.

The digital camera 10 is provided in the camera body 11 with a frontmost lens group LF of the photographing optical system which is exposed to the outside of the camera body 10 from the front end surface 11a. The frontmost lens group LF can be a lens group consisting of a single lens element or a plurality of lens elements. The camera body 11 is provided, on the front end surface 11a around the frontmost lens group LF, with a filter mounting screw 12 by which an accessory such as a filter can be attached to the front of the frontmost lens group LF. The photographing optical system of the digital camera 10, that is provided inside the camera body 11, is a zoom lens optical system having more than one lens group in addition to the frontmost lens group LF. Specifically, the photographing optical system is an internal-focusing/zooming optical system in which the focus or the focal length is altered by moving elements internally within the lens barrel (i.e., no external lens barrel is extended or retracted). Accordingly, the frontmost lens group LF does not move forward from the position thereof shown in the drawings.

The digital camera 10 is provided, on the top surface 11c of the camera body 11 in an area thereon close to the rear end surface 11b, with a mode select dial 14 and various manual operational buttons such as a power button 13, a playback button 15, a menu button 16 and a multi-direction button 17. The power button 13 serves as a manual operational member for turning ON and OFF a main switch of the digital camera 10. The mode select dial 14 serves as a manual operational member for selecting a desired photographing mode from among different photographing modes. The playback button 15 serves as a manual operational member for reproducing stored images on a liquid crystal display (LCD) portion (LCD panel/image display surface) 32. Upon an operation of the menu button 16, the digital camera 10 enters a setting changing mode in which various settings on the digital camera 10 can be changed and set by operating the multi-direction button 17. The multi-direction button 17 is also used to switch playback images to be displayed on the LCD portion 32. Various settings which can be changed by operating the menu button 16 include the settings of storing image size, image quality (the number of pixels), white balance and sensitivity, but are not limited solely to theses specific settings. The multi-direction button 17 is made of a momentary switch which can be operated to move in different directions. For instance, the multi-direction button 17 can be operated in biaxial directions orthogonal to each other (four directions: forward, rearward, right and left), and also in a press-down direction at an intersection of the aforementioned biaxial directions. The digital camera 10 is provided, on top of the camera body 11, in front of the various manual operational buttons, with a pop-up flash 18. The pop-up flash 18 can be switched between a pop-up position in which a light emitting portion of the pop-up flash 18 projects upwards from the top surface 11c of the camera body 11, and a retracted position in which the light emitting portion of the pop-up flash 18 is retracted down on the top surface 11c into the camera body 11. In each of FIGS. 1 through 12, the pop-up flash 18 is in the retracted position, and accordingly the light emitting portion of the pop-up flash 18 is not shown. The camera body 11 is provided in the vicinity of the ridge (border) between the upper surface 11c and the right side surface 11e with a card slot lid 19 for covering a card slot (not shown) formed on the camera body 11. This card slot is accessible from the outside of the camera body 11 by opening the card slot lid 19. In a state in which the cart slot lid 19 is open, a memory card in which image data are stored can be inserted and removed into and from the memory card slot.

The digital camera 10 is provided, on the left side surface 11f of the camera body 11 at regular intervals in the optical axis direction, with a flash mode select button 20, a drive mode select button 21 and a focus mode select button 22. The flash mode select button 20, the drive mode select button 21 and the focus mode select button 22 are positioned in substantially the same range, in the optical axis direction, as the aforementioned various manual operational members (13 through 17) in the optical axis direction. The flash mode select button 20 serves as a manual operational member for controlling the operation of the light emitting portion of the pop-up flash 18. By operating the flash mode select button 20, a desired flash mode can be selected from among different flash modes such as auto flash mode, compulsory flash mode, suppressed flash mode and red-eye reduction mode. The drive mode select button 21 serves as a manual operational button for selecting a drive mode at a shutter release from among different drive modes such as normal drive mode (single-frame mode), multi-frame consecutive photographing mode, self-timer photographing mode and auto-bracketing photographing mode. The focus mode select button 22 serves as a manual operational member for selecting a focus mode from among different focus modes such as normal auto focus mode, macro (close-up) photographing mode, infinity photographing mode and manual focus mode. The digital camera 10 is provided, on the left side surface 11f of the camera body 11 slightly in front of the flash select button 20, with speaker slits 23, and is further provided, on the camera body 11 below the speaker slits 23, with an external connector cover 24. The external connector cover 24 can be opened and closed (or detached and attached) with respect to the left side surface 11f of the camera body 11.

The digital camera 10 is provided at the back of the camera body 11 (on the rear end surface 11b) with an LCD monitor panel (image display portion) 25 which is mounted to the camera body 11 via a hinge portion 26 formed along the ridge (border) between the rear end surface 11b and the top surface 11c. The hinge portion 26 includes a pair of support arms 27, a middle support arm 28 and a pair of pivot pins 29. The pair of support arms 27 project from the camera body 11 at positions thereon laterally apart from each other. The middle support arm 28 to which the LCD monitor panel 25 is fixed to be supported thereby is held between the pair of support arms 27. The pair of pivot pins 29 project in opposite lateral directions away from each other from opposite ends of the middle support arm 28 to be respectively inserted into pin holes of the pair of support arms 27. Due to this structure of the hinge portion 26, the pair of support arms 27 and the middle support arm 28 can rotate relative to each other about the pair of pivot pins 29. An axis X1 of the pair of pivot pins 29 extends in a lateral direction of the digital camera 10 that is orthogonal to the optical axis O. The LCD monitor panel 25 can be manually rotated about the axis X1 between a retracted position (seated position; the position shown in FIGS. 4 and 9) in which the LCD monitor panel 25 is positioned on the rear end surface 11b to sit on the optical axis O, and a full-upright position (the position shown by two-dot chain lines in FIG. 8) in which the LCD monitor panel 25 is fully rotated forward (clockwise as viewed in FIG. 8) about the pair of pivot pins 29 so that an edge of the LCD monitor panel 25 which is on the opposite side of the LCD monitor panel 25 from the middle support arm 28 is positioned above the hinge portion 26. When in the retracted position, the LCD monitor panel 25 lies in a plane substantially orthogonal to the optical axis O. It is desirable that the range of rotation of the LCD monitor panel 25 between the retracted position and the full-upright position be equal to or greater than 180 degrees. In the present embodiment of the digital camera, the range of rotation of the LCD monitor panel 25 is set at about 210 degrees.

The LCD monitor panel 25 is supported by the middle support arm 28 to be rotatable on an axis X2 orthogonal to the axis X1. More specifically, a rotational pin 30 projects from a rectangular frame portion 25a of the LCD monitor panel 25 along the axis X2 thereon, while a pin-insertion hole in which the rotational pin 30 is rotatably fitted is formed on the middle support arm 28. Accordingly, the LCD monitor panel 25 is rotatable on either of the axes X1 and X2.

Although the pair of pivot pins 29 project from the middle support arm 28 to be respectively inserted into the pin holes formed on the pair of support arms 27 in the hinge portion 26 in the above illustrated embodiment of the digital camera 10, it is possible for the pair of pivot pins 29 to project from the pair of support arms 27 to be respectively inserted into pin holes formed on the middle support arm 28.

Although the rotational pin 30 projects from the rectangular frame portion 25a of the LCD monitor panel 25 to be rotatably fitted into the pin-insertion hole formed on the middle support arm 28 in the above illustrated embodiment of the digital camera 10, it is possible for the rotational pin 30 to project from the middle support arm 28 to be rotatably fitted into a pin-insertion hole formed on the rectangular frame portion 25a of the LCD monitor panel 25.

The frame portion 25a of the LCD monitor panel 25 is provided with four edge portions surrounding the rectangular LCD portion 32. The shape and size of the LCD monitor panel 25 are determined so that three of the four edge portions of the frame portion 25a, except for one of the four edge portions which is adjacent to the middle support portion 28, are substantially flush with the bottom surface 11d, the right side surface 11e and the left side surface 11f, respectively, when the LCD monitor panel 25 is in the retracted position, in which the LCD monitor panel 25 is positioned on the rear end surface 11b of the camera body 11 as shown in FIGS. 4 and 9 (see FIGS. 3 through 9).

Figure 8:
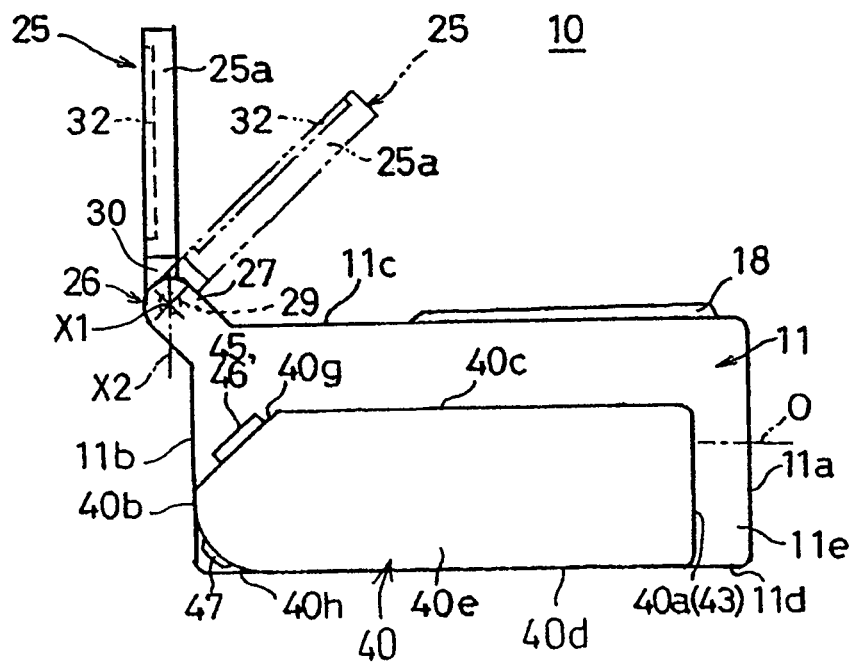
FIG. 8 is a side elevational view of the digital camera shown in FIGS. 1 and 2, showing a state in which an LCD monitor panel is in an upright position.

If the LCD monitor panel 25 is rotated about the axis X1 to stand vertically as shown in FIG. 8 (from the state shown in FIG. 4 in which the LCD portion 32 faces the rear end surface 11b of the camera body 11), the LCD portion 32 faces rearwards (usually toward the user of the digital camera) so that the LCD portion 32 can be used as a monitor for either showing the view through the photographing optical system or displaying stored images during playback. Although FIG. 8 show only two states of the LCD monitor panel 25: a state of the LCD monitor panel 25 that is rotated by approximately 180 degrees from the retracted state thereof to stand vertically (the LCD monitor panel 25 shown by solid lines in FIG. 8), and a state of the LCD monitor panel 25 that is positioned in the aforementioned full-upright position (the position shown by two-dot chain lines in FIG. 8), the hinge portion 26 is provided with a frictional mechanism (or a click mechanism) by which the LCD monitor panel 25 can be stopped at other angular positions between the retracted position and the full-upright position.

Figure 10:
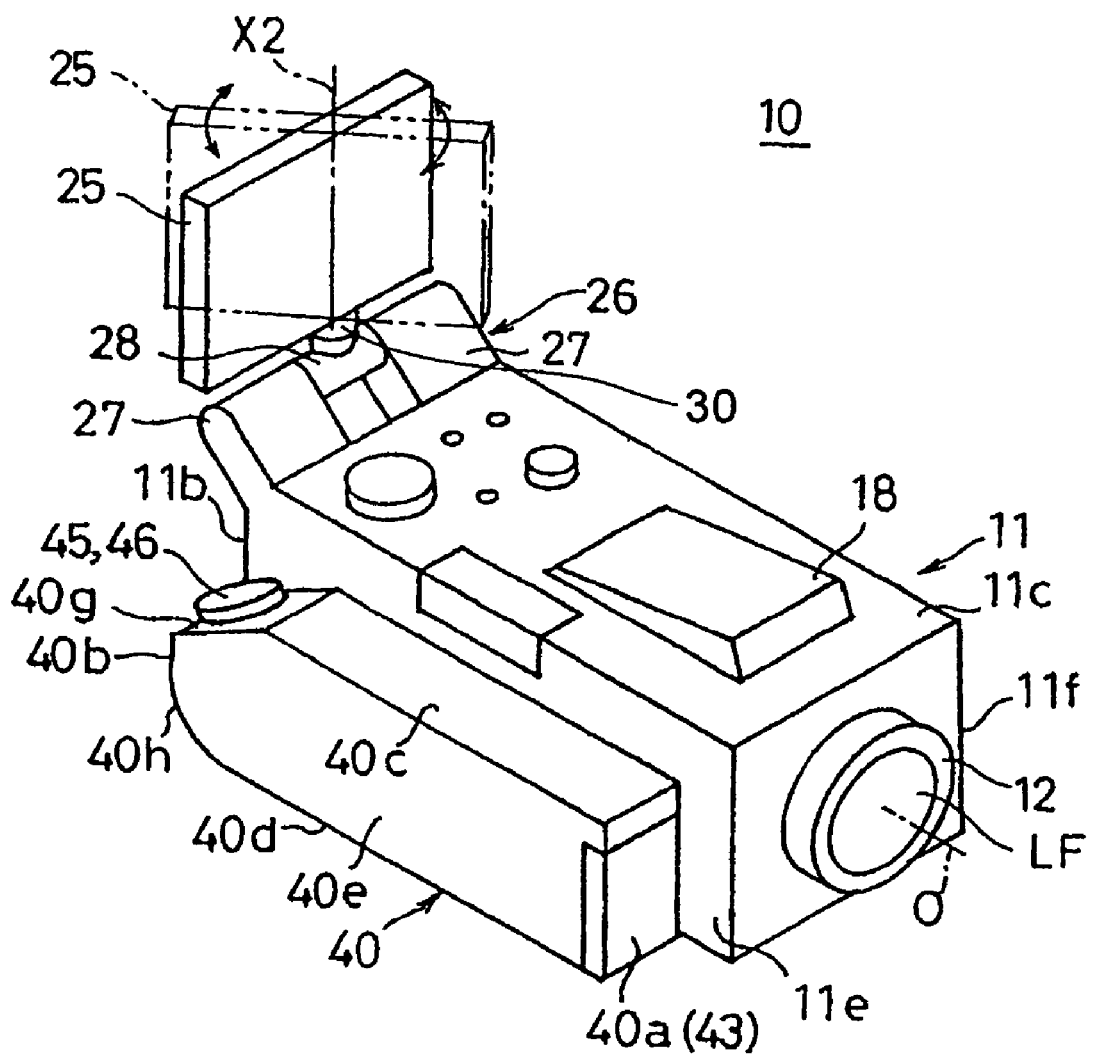
FIG. 10 is a front view in perspective of the digital camera shown in FIGS. 1 and 2; showing a state in which the LCD monitor panel is in an upright position.

The LCD portion 32 in an upright position can be made to face toward the front of the digital camera 10 by rotating the LCD monitor panel 25 about the axis X2 as shown in FIG. 10. Orientating the LCD portion 32 so as to face the front of the digital camera 10 is suitable for the case where the user photographs himself/herself (self portrait) while holding the digital camera 10. From this position, if the LCD monitor panel 25 is rotated about the axis X1 toward the retracted position to a degree that the LCD portion 32 lies in a plane substantially parallel to the top surface 11c of the camera body 11, the LCD portion 32 becomes suitable as a waist-level monitor. Additionally, from this position, if the LCD monitor panel 25 is further rotated about the axis X1 to the rear end surface 11b, the LCD portion 32 faces toward the rear of the digital camera 10, not facing the rear end surface 11b as shown in FIG. 9. In this position shown in FIG. 9, the LCD portion 32 can be viewed without the LCD monitor panel 25 projecting (standing up) from the camera body 11. Although the vertical position of the LCD portion 32 is reversed if the LCD monitor panel 25 is rotated from the position shown in FIG. 8 to the position shown in FIG. 9, or from the position shown in FIG. 9 to the position shown in FIG. 8, the digital camera 10 is provided with a detector which detects a variation in orientation of the LCD monitor panel 25 with respect to the camera body 11, and a display image controller so that the LCD portion 32 displays an image in an upright position when viewed by the user. When the digital camera 10 is carried, it is desirable that the LCD monitor panel 25 be in the retracted position with the LCD portion 32 facing the rear end surface 11b as shown in FIG. 4 to prevent the LCD portion 32 from being damaged.

The digital camera 10 is provided on the right side surface 11e with a grip 40. The grip 40 is formed in a substantially rectangular parallelepiped similar to the camera body 11. The outer surface of the grip 40 includes opposite end surfaces (grip end surfaces) 40a and 40b, and four longitudinal side surfaces 40c, 40d, 40e and 40f which are elongated in a direction orthogonal to both the grip end surfaces 40a and 40b. The grip end surfaces 40a and 40b are substantially parallel to each other, the longitudinal side surfaces 40c and 40d are substantially parallel to each other, and the longitudinal side surfaces 40e and 40f are substantially parallel to each other. The grip 40 is provided inside thereof with a battery chamber in which a battery pack 42 (shown by broken lines in FIG. 1) serving as a power source for driving the digital camera 10 is accommodated. The grip 40 is provided thereon with a battery chamber lid 43, an outer surface of which forms a major portion of the grip end surface 40a.

The grip 40 is pivoted on the camera body 11 about a pivot shaft 41. The pivot shaft 41 connects the grip 40 to the camera body 11 so that the right side surface 11e of the camera body 11 and the longitudinal side surface 40f of the grip 40 are connected to each other via the pivot shaft 41. An axis X3 of the pivot shaft 41 is substantially parallel to the axis X1 of the pair of pivot pins 29 of the hinge portion 26. The position of the pivot shaft 41 (the axis X3) is in the vicinity of the grip end surface 40b, thus being eccentrically positioned from a center of the grip 40 with respect to the lengthwise direction of the grip 40. Accordingly, the grip 40 can be rotated about the axis X3 while the free end of the grip 40 on the grip end surface 40a (the battery chamber lid 43) moves along an arc about the axis X3.

FIG. 4 shows a state in which the grip 40 is positioned at one end (retracted position) in the range of rotation of the grip 40, and FIG. 5 shows a state in which the grip 40 is at the other end (rearward-jutting position) of the range of rotation of the grip 40. Although the lengthwise direction of the grip 40 is substantially parallel to the lengthwise direction of the camera body 11 at either the retracted position and the rearward-jutting position, the positions of the opposite ends 40a and 40b of the grip are reversed between the grip 40 shown in FIG. 4 and the grip 40 shown in FIG. 5. When the grip 40 is positioned in the retracted end position as shown in FIG. 4, the grip end surface 40a of the grip 40 (the battery chamber lid 43) faces toward the front of the digital camera 10, and the periphery of the grip 40 is enclosed by the periphery of the right side surface 11e as viewed from the right side of the digital camera 10. In other words, in the state shown in FIG. 4, the entire length of the grip 40 in the lengthwise direction thereof (horizontal direction as viewed in FIG. 4) is included within the length of the camera body 11 in the optical axis direction, while the entire width of the grip 40 in a direction orthogonal to the two longitudinal side surfaces 40c and 40d (in the vertical direction as viewed in FIG. 4) is included within the height of the camera body 11 in the vertical direction of the digital camera 10. Therefore, no part of the grip 40 juts outside the periphery of the camera body 11 in either the forward/rearward direction or the vertical direction of the digital camera 10. Accordingly, in the state shown in FIG. 4, the grip 40 and the camera body 11 appear as a single box unit, so that the digital camera 10 is easy to carry. Moreover, in the state shown in FIG. 4, the digital camera 10 can be placed on a floor or a desk stably because the grip 40 does not project downwards. Accordingly, the digital camera 10 is suitable for taking pictures with the camera body placed on such a flat location without the use of a tripod. When the grip 40 is in the retracted position as shown in FIG. 4, the longitudinal side surface 40d of the grip 40 (the bottom surface of the grip 40 as viewed in FIG. 4) is substantially flush with the bottom surface lid of the camera body 11 (see FIGS. 3 and 11). This structure improves the stability of the digital camera 10 in the case where the digital camera 10 is placed on a flat location such as a floor or a desk with the bottom surface 11d facing downwards.

During a photographing operation, the grip 40 is rotated clockwise from the retracted position as viewed in FIG. 4 by the user's hand so that the user can thereafter hold the digital camera 10 by holding the grip 40. The pivot shaft 41 is provided with a frictional mechanism (or a click mechanism) by which the grip 40 can be stopped at various angular positions between the retracted position (the position shown in FIG. 4) and the rearward-jutting position (the position shown in FIG. 5). According to this frictional mechanism, the angular position of the grip 40 relative to the camera body 10 can be freely selected by the user. The angular position of the LCD monitor panel 25 with respect to the camera body 11 can be freely adjusted by rotating the LCD monitor panel 25 about the axis X1 or on the axis X2 as described above. By rotating the angular position of the grip 40 about the axis X3 for adjustment, independently of the above described positional adjustment of the LCD monitor panel 25, a high degree of flexibility in photographing posture can be achieved. Specifically, the structure wherein the axis of rotation (the axis X1) of the LCD monitor panel 25 and the axis of rotation (the axis X3) of the grip 40 are parallel to each other and extend in the lateral direction (horizontal direction as viewed in FIG. 3) of the digital camera 10 makes it possible to change both the vertical position and the vertical angle of the digital camera 10 at will without loss of the ability of the digital camera 10 to be held by hand and without loss of the viewability of the LCD portion 32.

Figure 11:
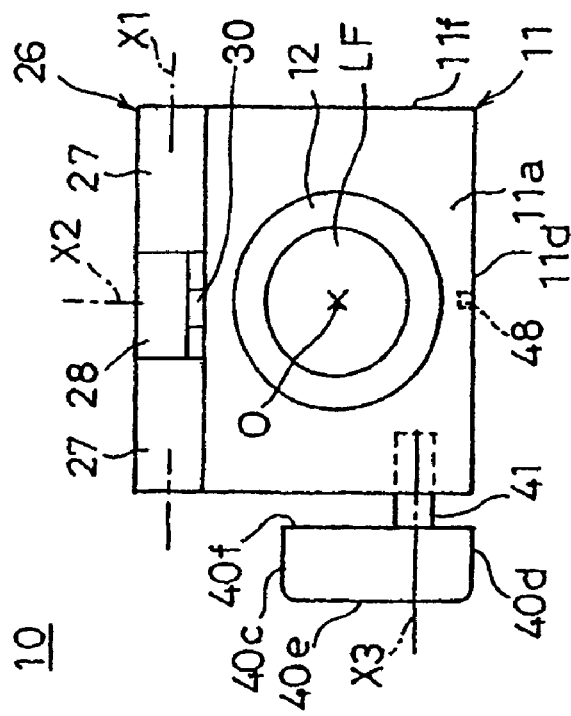
FIG. 11 is a front elevational view of the digital camera shown in FIGS. 1 and 2, showing a state in which the grip is positioned closely to the camera body.
Figure 12:
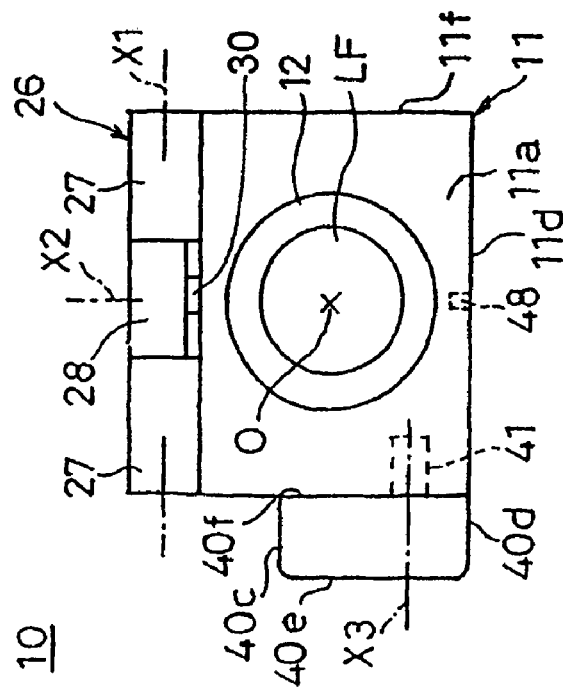
FIG. 12 is a front elevational view of the digital camera shown in FIGS. 1 and 2, showing a state in which the grip is in an extended positioned from the camera body.
Figure 13:
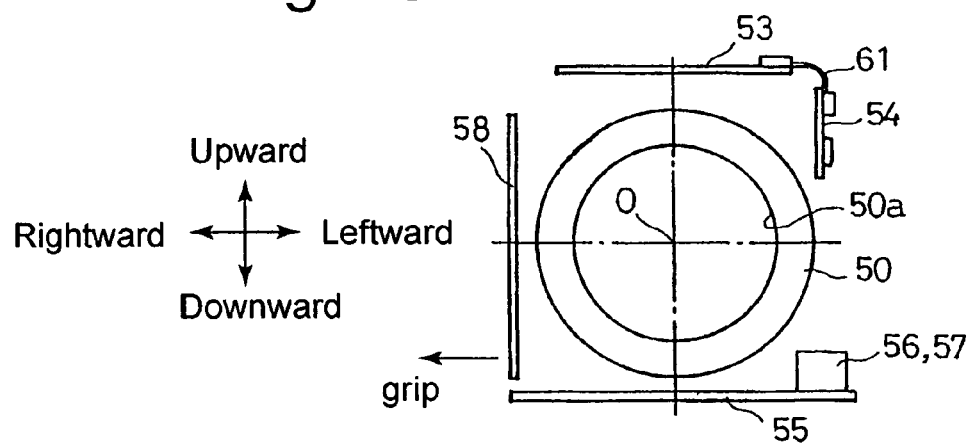
FIG. 13 is a front elevational view of internal elements of the digital camera shown in FIGS. 1 and 2, showing internal circuitry thereof.
Figure 14:
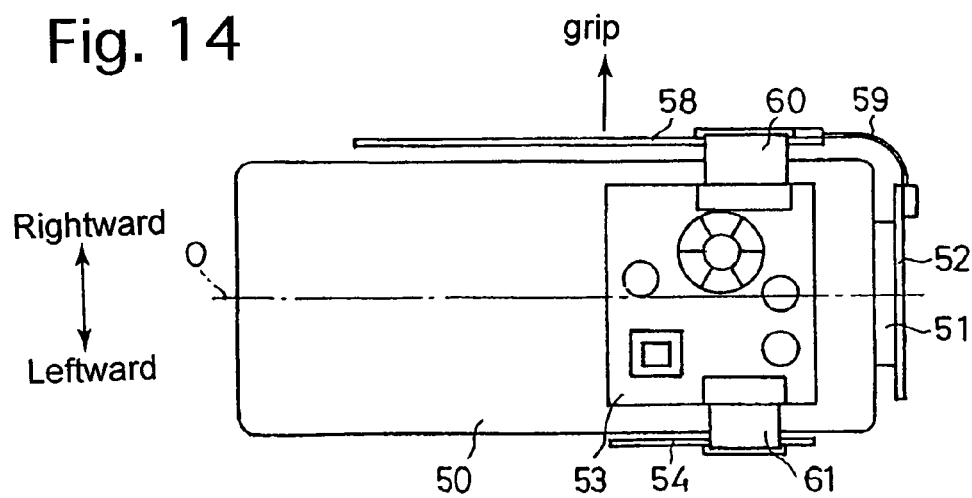
FIG. 14 is a plan view of the internal elements shown in FIG. 13.
Figure 15:
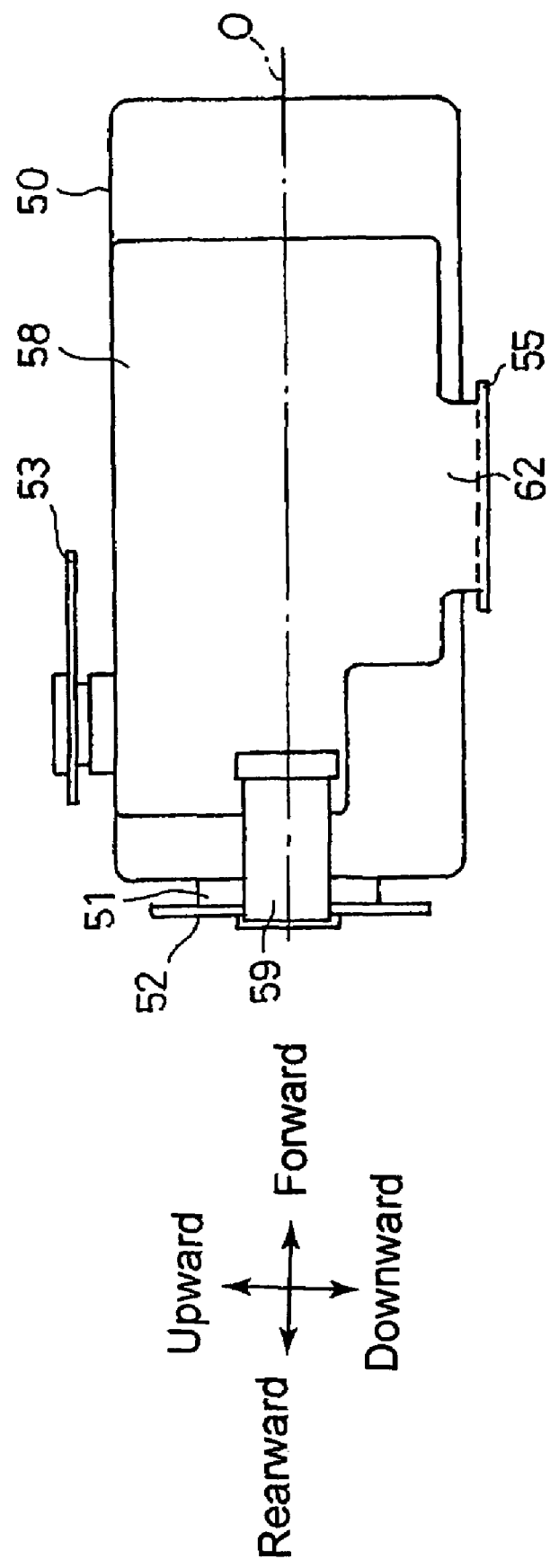
FIG. 15 is a side elevational view of the internal elements shown in FIG. 13.
Figure 16:
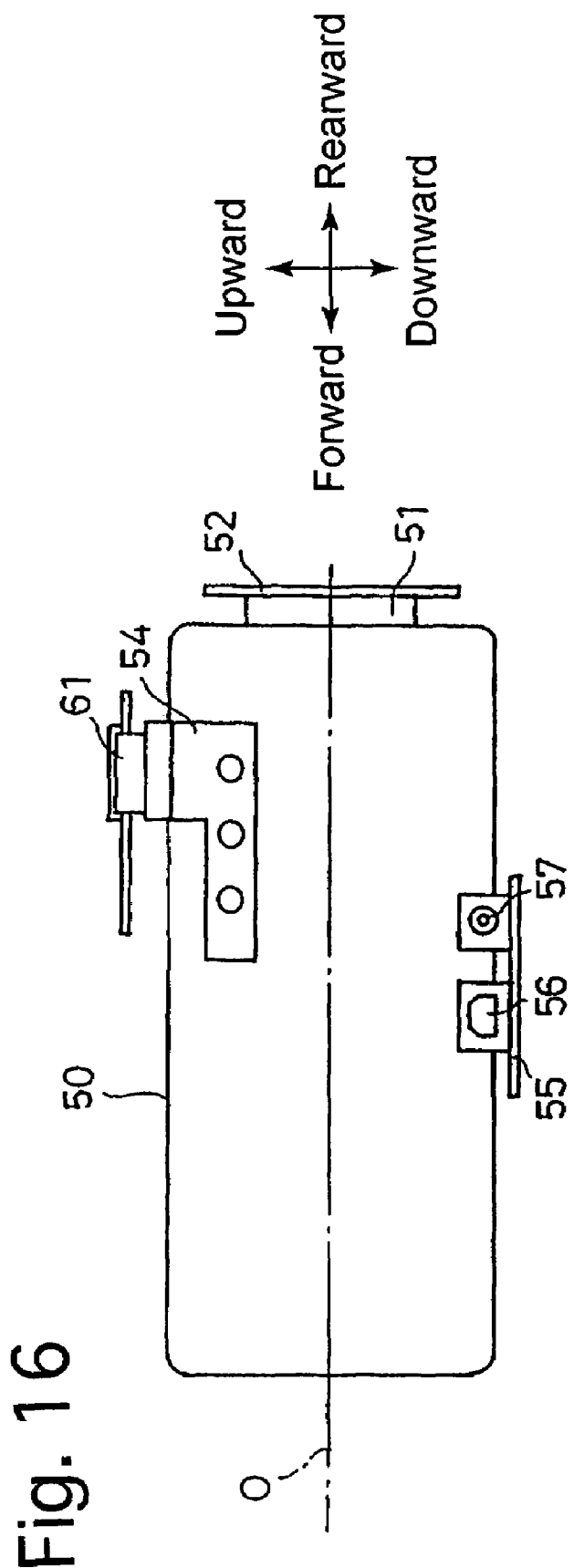
FIG. 16 is a side elevational view of the internal elements shown in FIG. 13, viewed from the side opposite to the side shown in FIG. 15.

The pivot shaft 41 is constructed to allow the grip 40 to be positioned on and jutted away from the right side surface 11e of the camera body 11 in a direction along the axis X3 (the lateral direction of the digital camera 10) as shown in FIGS. 11 and 12. This operation of positioning the grip 40 on and jutted away from the right side surface 11e of the camera body 11 can be performed independently of the above described operation of rotating the grip 40 about the axis X3. For instance, the digital camera 10 can be made compact with the grip 40 jutting from the periphery of the camera body 11 by a minimum amount by positioning the grip 40 close to the camera body 11 when the grip 40 is positioned in the retracted position (the position shown in FIG. 4) as shown in FIG. 11. On the other hand, during a photographing operation, wherein the user holds the grip 40, the camera body 11 (specifically the right side surface 11e thereof) and the user's hand which holds the grip 40 are prevented from interfering with each other by pulling the grip 40 outward (leftward as viewed in FIG. 11) to position where the grip 40 juts away from the camera body 11 by a predetermined distance as shown in FIG. 12, which improves the ability of the grip 40 to be held by hand. Although FIG. 12 shows a state in which the lengthwise direction of the grip 40 is substantially parallel to the lengthwise direction of the camera body 11, from this state the grip 40 can be rotated about the axis X1 to be freely set at any angular position relative to the camera body 11.

As described above, the grip 40 is formed in a substantially box shape (rectangular parallelepiped), and the outer surface of the grip 40 is provided with three pairs of flat surfaces (the two grip end surfaces 40a and 40b, the two longitudinal side surfaces 40c and 40d, and the two longitudinal side surfaces 40e and 40f). The outer surface of the grip 40 is further provided in the vicinity of the grip end surface 40b with an inclined surface 40g which connects the grip end surface 40b with the longitudinal side surface 40c, and a curved surface 40h which constitutes a chamfered portion of the grip end surface 40b at the portion thereof which extends to the longitudinal side surface 40d. The inclined surface 40g, the grip end surfaces 40a and 40b, the curved surface 40h and the longitudinal side surfaces 40c and 40d constitute a surrounding surface which is substantially parallel to the axis X3 and surrounds the axis X3. The inclined surface 40g is formed as a surface non-parallel to any other external surface of the grip 40. The grip 40 is provided on the inclined surface 40g with a release button (first manual operational member) 45 and a ring-shaped zoom switch 46 which surrounds the release button 45. The curved surface 40h of the grip end surface 40b is formed to have an external positive curvature. The grip 40 is provided on the curved surface 40h with a moving-image recording button (second manual operational member) 47. The release button 45 serves as a manual operational member for photographing still images. A photometering operation and a distance measuring operation are carried out when the release button 45 is depressed halfway down, and a shutter is released when the release button 45 is fully depressed. A photographing mode and other settings are set with the above described various manual operational members as appropriate. On the other hand, the moving-image recording button 47 serves as an manual operational member for recording moving images. An operation of recording moving images commences immediately after the moving-image recording button 47 is depressed once, and thereafter stops immediately after the moving-image recording button 47 is depressed once again. The still images and moving images are processed via an image processor to be stored in a memory card as electronic image data.

As shown in FIG. 4, the inclined surface 40g is formed on the camera body 11 so as to be neither parallel nor orthogonal to a straight line (third straight line) S which extends in a lengthwise direction of the grip 40 between the longitudinal side surfaces 40c and 40d. It is desirable that an angle of inclination K1 of the inclined surface 40g relative to the straight line S be set at an angle between 15 to 75 degrees, more desirably between 30 to 60 degrees. The release button 45 on the inclined surface 40g faces toward the front of the digital camera 10 when the grip 40 is positioned so that the grip end surface 40a (the battery chamber lid 43) faces obliquely rearward and in a downward direction as shown in FIG. 6. In an ordinary photographing posture in which the user holds the digital camera 10 at eye-level or in the vicinity thereof, it is assumed that the grip 40 is positioned within a angular range thereof with the angle of the grip 40 shown in FIG. 6 at a central angle of the angular range. Considering the shape of a human hands, the release button 45 can be easily operated by an index finger (forefinger) if the grip 40 extends obliquely rearward, in a downward direction so that the release button 45 faces substantially toward the front of the digital camera 10 as shown in FIG. 6.

When the grip 40 is in the angular position shown in FIG. 6, the moving-image recording button 47 faces a substantially upward direction of the digital camera 10 so that the position of the moving-image recording button 47 naturally corresponds to the position of the thumb of the user's hand (right hand in the present embodiment of the digital camera) which holds the grip 40 when the index finger is put on the release button 45, due to the moving-image recording button 47 being provided on the grip end surface 40b that is adjacent to the inclined surface 40g and non-orthogonal to the inclined surface 40g. The moving-image recording button 47 is positioned on the curved surface 40h, which is chamfered so as to have an external positive curvature, and also the moving-image recording button 47 projects obliquely outwards in an inclination direction substantially opposite (symmetrical) to the axis of the release button 45 with respect to the straight line S (which extends in a lengthwise direction of the grip 40 between the longitudinal side surfaces 40c and 40d, as shown in FIG. 4). With this positional relationship between the moving-image recording button 47 and the release button 45, in which the pressing direction of the moving-image recording button 47 is inclined with respect to the pressing direction of the release button 45, the thumb of the user's hand (right hand in the present embodiment of the digital camera) holding the grip 40 can be put on the moving-image recording button 47 more naturally, which further improves the operability of the digital camera 10. It is desirable that an angle of inclination K2 of the moving-image recording button 47 relative to the straight line S be set at an angle substantially equal to the angle K1 of the inclined surface 40g (i.e., an angle of the release button 45 relative to the straight line S).

Accordingly, when the grip 40 is in the angular position shown in FIG. 6, in which the grip 40 is orientated to extend obliquely downwards, or in an angular position in the vicinity thereof, the release button 45 substantially faces an upward direction of the digital camera 10, the moving-image recording button 47 substantially faces a frontward direction of the digital camera 10, and the position of the moving-image recording button 47 naturally corresponds to the position of the thumb of the user's hand when the user holds the grip 40 with the index finger placed on the release button 45. Namely, the release button 45 and the moving-image recording button 47 are disposed on the grip 40 at positions so as to allow the user to operate the release button 45 and the moving-image recording button 47 easily and naturally when the grip 40 is rotated to be set in an operating position (ready-to-photograph position) as shown in FIG. 6.

The angle of the grip 40 relative to the camera body 11 in a ready-to-photograph state is not limited solely to those shown in FIGS. 5 and 6. For instance, when the user takes still or moving images while holding the digital camera 10 above their head, the grip 40 may be positioned at a substantially right-angle relative to the camera body 11 so that the grip end surface 40a (the battery chamber lid 43) faces vertically downwards. In this case, it is conceivable that the user holds the grip 40 with their hand while straightening the arm vertically upwards so that the arm extends in a direction substantially parallel to the lengthwise direction of the grip 40, and accordingly, the index finger and the thumb of the hand holding the grip 40 can be naturally placed on the release button 45 and the moving-image recording button 47, respectively, similar to the case shown in FIG. 6, which allows the user to operate the release button 45 and the moving-image recording button 47 comfortably.

The grip 40 is supported on the pivot shaft 41 at a position on the grip 40 which is eccentric to a center of the grip 40 in the lengthwise direction thereof to be positioned in the vicinity of the grip end surface 40b, and the release button 45 and the moving-image recording button 47 are disposed at positions on the grip 40 in radially outward directions from the pivot shaft 41 (the axis X3) in the relatively close vicinity of the pivot shaft 41. Accordingly, the positions of the release button 45 and the moving-image recording button 47 are not displaced largely with respect to the camera body 11 when the grip 40 is rotated relative to the camera body 11, which does not easily deteriorate the operability of each of the release button 45 and the moving-image recording button 47. Additionally, the release button 45 and the moving-image recording button 47 are positioned substantially on an imaginary cylindrical surface about the pivot shaft 41 (the axis X3), so that either the distance from the pivot shaft 41 to the release button 45 or the distance from pivot shaft 41 to the moving-image recording button 47 does not change even if the grip 40 is rotated. This arrangement also facilitates the operability of the release button 45 and the moving-image recording button 47.

As can be understood from the above description, the positions of the release button 45 and the moving-image recording button 47 are determined so that the user can easily operate the release button 45 and the moving-image recording button 47 regardless of the angle of the grip 40 relative to the camera body 11.

The camera body 11 is provided on the bottom surface 11d with a tripod socket (female screw hole) 48 which is open downwards from the camera body 10 (see FIG. 4). Since the LCD monitor panel 25 and the grip 40 are supported on the rear end surface 11b and the right side surface 11e, respectively, neither the LCD monitor panel 25 nor the grip 40 overlap the bottom surface 11d of the camera body 11 even if rotated. Therefore, the tripod socket 48 is never covered by either of the LCD monitor panel 25 and the grip 40. Accordingly, even though the digital camera 10 is provided on the camera body with two independent rotatable members: the grip 40 and the LCD monitor panel 25, a photographing operation using a tripod can be carried out regardless of the of the positions of the LCD monitor panel 25 and the grip 40. Moreover, the digital camera 10 can be stably put on a floor or the like without the use of a tripod if the grip 40 is rotated to the retracted position. Namely, the digital camera 10 can be used not only in an ordinary situation in which the user takes still or moving images while holding the digital camera 10 with their hand but also in other photographing positions.

In a photographing operation, with the user holding the digital camera 10, it is generally the case that the user holds the digital camera 10 with their right hand gripping the grip 40 and with their left hand holding the camera body 11. Furthermore, it is normally the case that the palm of the left hand supports the camera body 11 from the bottom surface lid while the thumb of the left hand is laid on the left side surface 11f, and accordingly, there is little possibility of performing an unintentional operation due to no manual operational members being provided on the bottom surface 11d. The bottom surface 11d comes in contact with the left hand by an area larger than any other external surface portions of the digital camera 10. Moreover, the photographing mode and other settings can be set without changing the user's photographing posture because the manual operational members which are frequently used during photographing, such as the flash mode select button 20, the drive mode select button 21 and the focus mode select button 22, are positioned on the left side surface 11f, on which the thumb of the left hand is placed.

During playback of recorded still and/or moving images on the LCD portion 32, it is assumed that the user holds the digital camera 10 with some fingers placed on the upper surface 11c of the camera body 11. Accordingly, manual operational members used for playback images are positioned on the top surface 11c, so that the user can easily operate these manual operational members without changing the above described photographing posture. During playback of recorded still and/or moving images, the user can hold the digital camera 10 with both hands holding the camera body 11 with the grip 40 positioned in the retracted position.

FIGS. 13 through 16 show the internal circuitry of the digital camera 10, viewed from different angles. The digital camera 10 is provided in the camera body 11 with a hollow-cylindrical holder 50 which supports the photographing optical system of the digital camera 10. The holder 50 holds the photographing optical system so that the axis of the holder 50 is coincident with the optical axis O. The holder 50 is provided at the front end thereof with an aperture 50a for holding the frontmost lens group LF therein. The digital camera 10 is provided in the camera body 11 with a CCD image sensor 51 mounted to a CCD substrate 52. The CCD image sensor 51 is fixed at the rear end of the holder 50 via the CCD substrate 52. Although the holder 50 that serves as a member for holding the photographing optical system is formed as a single member for the purpose of making the location of the photographing optical system easier to recognize, the holding member does not have to be formed as a single member like the holder 50.

The CCD image sensor 51 and other optical elements such as the frontmost lens group LF are elements of the photographing optical system of the digital camera 10. The CCD substrate 52 is positioned between the rear end of the holder 50 and the rear end surface 11b of the camera body 11 to lie in a plane substantially orthogonal to the optical axis O. In addition to the CCD substrate 52, the digital camera 10 is provided in the camera body 11 with a first switch substrate 53, a second switch substrate 54, a jack substrate 55 and a main substrate 58. The first switch substrate 53 is formed as a flat board, and is positioned between the holder 50 and the top surface 11c of the camera body 11 to be substantially parallel to the top surface 11c. The power button 13, the mode select dial 14, the playback button 15, the menu button 16 and the multi-direction button 17 are mounted to the first switch substrate 53. The second switch substrate 54 is formed as a flat board, and is positioned between the holder 50 and the left side surface 11f of the camera body 11 to be substantially parallel to the left side surface 11f. The flash mode select button 20, the drive mode select button 21 and the focus mode select button 22 are mounted to the second switch substrate 54. The jack substrate 55 is formed as a flat board, and is positioned between the holder 50 and the bottom surface 11d of the camera body 11 to be substantially parallel to the bottom surface 11d. A PC jack 56 for connection to a personal computer and an adapter jack 57 for power adapter (e.g., AC adapter) are mounted to the jack substrate 55. The PC jack 56 and the adapter jack 57 are positioned on the left side surface 11f to be accessible from the outside of the camera body 11 if the external connector cover 24 is opened. The main substrate 58 is formed as a flat board, and is positioned between the holder 50 and the right side surface 11e of the camera body 11 to be substantially parallel to the right side surface 11e. Various components such as a microcomputer for controlling the overall operation of the digital camera 10 and a circuit for processing image data are mounted to the main substrate 58. The main substrate 58 is greater in length than any of the first switch substrate 53, the second switch 54 and the jack substrate 55 in the optical axis direction (forward/rearward direction of the digital camera 10). The CCD substrate 52 and the first switch substrate 53 are connected to the main substrate 58 via a flexible PWB 59 and a flexible PWB 60, respectively. The second switch substrate 54 is connected to the first switch substrate 53 via a flexible PWB 61 to send signals to the main substrate 58 via the first switch substrate 53. The jack substrate 55 is connected to the main substrate 58 via a connector 62.

As can be seen from FIGS. 13 through 16, the photographing optical system (the holder 50) of the digital camera 10 is positioned in an internal space thereof which is surrounded by a circuit board consisting of the CCD substrate 52, the first switch substrate 53, the jack substrate 55 and the main substrate 58. Specifically, the photographing optical system that is provided in the present embodiment of the digital camera is an internal-focusing/zooming optical system, in which the focus or the focal length is altered by moving elements internally within the lens barrel as mentioned above, and accordingly no portion of the photographing optical system projects forward from the front of the camera body 11, and therefore remains within the camera body 11 at all times. Additionally, the CCD substrate 52, the first switch substrate 53, the jack substrate 55 and the main substrate 58 are positioned in the camera body 11 to surround the photographing optical system. This circuit arrangement saves space for electrical components in the camera body 11, thus contributing to improvement in degree of freedom in miniaturization and design of the digital camera 10. The camera body 11 is formed as a substantially rectangular parallelepiped which is elongated along the optical axis O specifically in the illustrated embodiment of the digital camera as mentioned above, and this shape of the camera body 11 is advantageous to install the first switch substrate 53, the second switch substrate 54, the jack substrate 55 and the main substrate 58 along an inner surface of the camera body 11 which extends in the lengthwise direction of the camera body 11.

In the present embodiment of the digital camera, the rotatable grip 40 is mounted to the right side surface 11e of the camera body 11. It is desirable that no elements such as operational switches or terminals (jacks) be provided on a surface of the camera body to which a rotatable member such as the grip 40 is mounted in order to prevent the rotatable member from interfering with such elements. To this end, the first switch substrate 53 and the second switch substrate 54, which include switch contacts, and the jack substrate 55, which includes electrical terminals, are installed along three inner surfaces of the camera body 11 which correspond to the top surface 11c, the bottom surface 11d and the left side surface 11f, respectively, and no substrate is installed along an inner surface of the camera body 11 which corresponds to the right side surface 11e. By taking advantage of this structure in which no elements such as switches or terminals are installed (cannot be installed) to the right side surface 11e of the camera body 11, the main substrate 58, which does not have to be connected to any external parts or devices, is installed in the immediate area of the inner surface of the camera body 11 which corresponds to the right side surface 11e. As can be seen from FIGS. 14 and 15, the internal space of the camera body 11 on the right side surface 11e is exclusively assigned to the installation of the main substrate 58, which makes it possible to adopt the large main substrate 58 that is shaped to have a length close to the length of the holder 50 in the optical axis direction.

Likewise, no elements such as switches or terminals are installed on the rear end surface 11*b* of the camera body 11, which supports the movable LCD monitor panel 25 (a movable member like the grip 40), while the CCD substrate 52, which does not have to be connected to any external parts or devices similar to the main substrate 58, is installed in the immediate area of an inner surface of the camera body 11 which corresponds to the rear end surface 11*b*. In terms of the efficiency of saving space and simplifying circuitry, it is desirable that the CCD substrate 52, on which the CCD image sensor 51 is mounted, be positioned in the internal space of the camera body 11 in the vicinity of the rear end surface 11*b* since the internal space of the camera body 11 in the vicinity of the rear end surface 11*b* is adjacent to the rear end of the photographing optical system.

As can be understood from the above descriptions, in the above illustrated embodiment of the digital camera, a high degree of flexibility in photographing posture and an improvement in operability of the digital camera 10 are obtained by designing the LCD monitor panel 25 and the grip 40 to be rotatable independently of each other. In addition, the release button 45 and the moving-image recording button 47 are easy to operate regardless of the rotational position (angular position) of the grip 40.

In the above illustrated embodiment of the digital camera, the placement of the circuitry in the camera body 11 and also the placement of the manual operational members on the outer surface of the camera body 11 are well devised as described above, which achieves a high functionality of the camera body 11.

Figure 17:
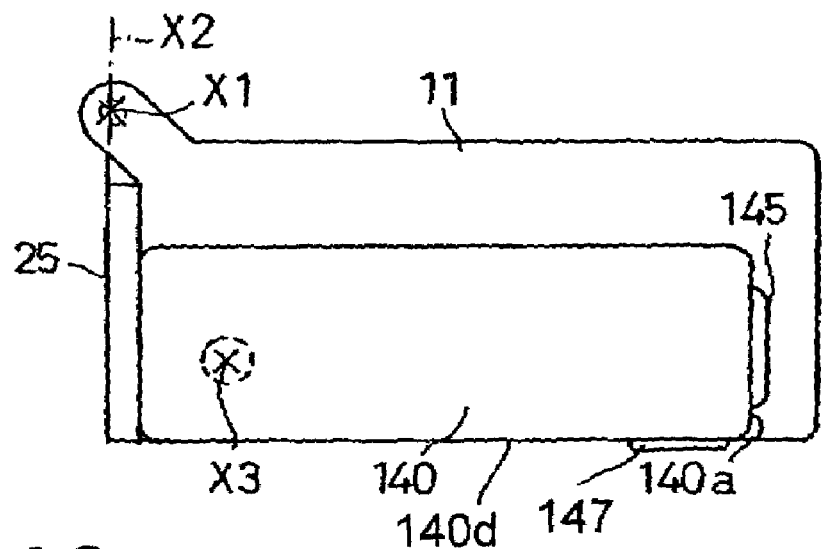
FIG. 17 is a view similar to FIG. 4, showing another embodiment of the digital camera which is provided with a grip having a structure different from the structure of the grip of the digital camera shown in FIGS. 1 and 2.
Figure 18:
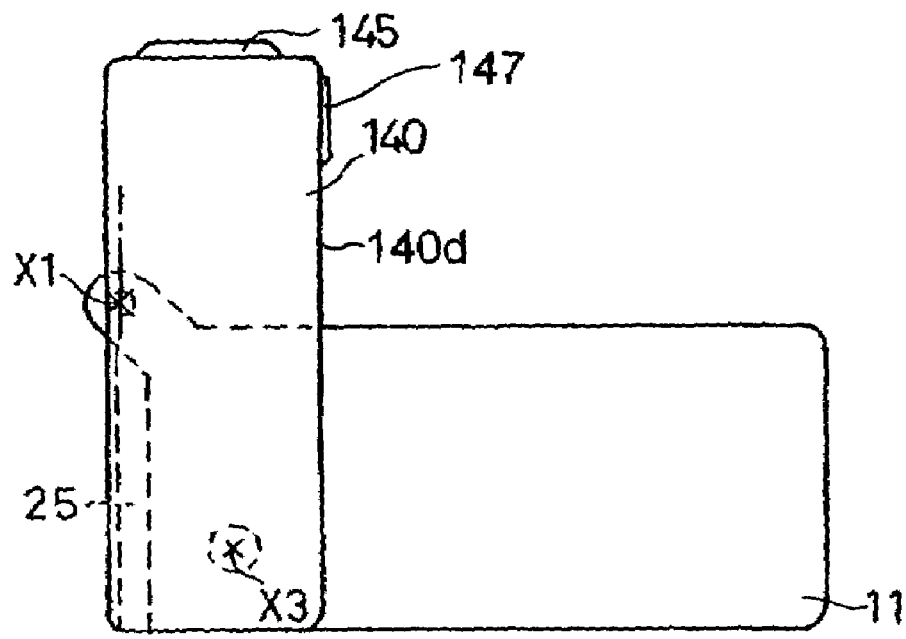
FIG. 18 is a side elevational view of the digital camera shown in FIG. 17, showing a state in which the grip is rotated to extend upwards from the camera body.

It is possible to modify the structure of the grip 40 in the above illustrated embodiment of the digital camera. FIGS. 17 and 18 show another embodiment of the digital camera provided with a rotatable grip 140 having a structure different from the structure of the grip 40 of the digital camera 10 shown in FIGS. 1 and 2. For instance, when positioned in a retracted position shown in FIG. 17, the grip 140 is in a position substantially equivalent to the retracted position of the grip 40 of the previous embodiment of the digital camera; however, the direction of rotation of the grip 140 from the retracted position to a rotation position in which the grip 140 projects outwards from the camera body is opposite to that of the grip 40. As shown in FIG. 18, the grip 140 can be rotated in a direction (counterclockwise as viewed in FIG. 17) so that one of opposite end surfaces (grip end surfaces) of the grip 140 that is positioned farther from a pivot shaft 141 (which corresponds to the pivot shaft 41 of the grip 40), i.e., a grip end surface 140*a*, faces upward. A release button (first manual operational member) 145 (which corresponds to the release button 45) is provided on the grip end surface 140*a* so that the user can easily operate the release button 145 by the thumb of the user's hand holding the grip 140 when the grip 140 is in the angular position shown in FIG. 18. A moving-image recording button (second manual operational member) 147 (which corresponds to the moving-image recording button 47) is provided on a longitudinal side surface 140*d* so that the user can easily operate the moving-image recording button 147 by the index finger (forefinger) of a hand holding the grip 140 when the grip 140 is in the angular position shown in FIG. 18. The surface of the grip 140 which supports the release button 145 and/or the moving-image recording button 147 can be provided with an inclined surface which is inclined like the inclined surface 40*g* and/or a curved surface corresponding to the curved surface 40*h*.

Figure 19:
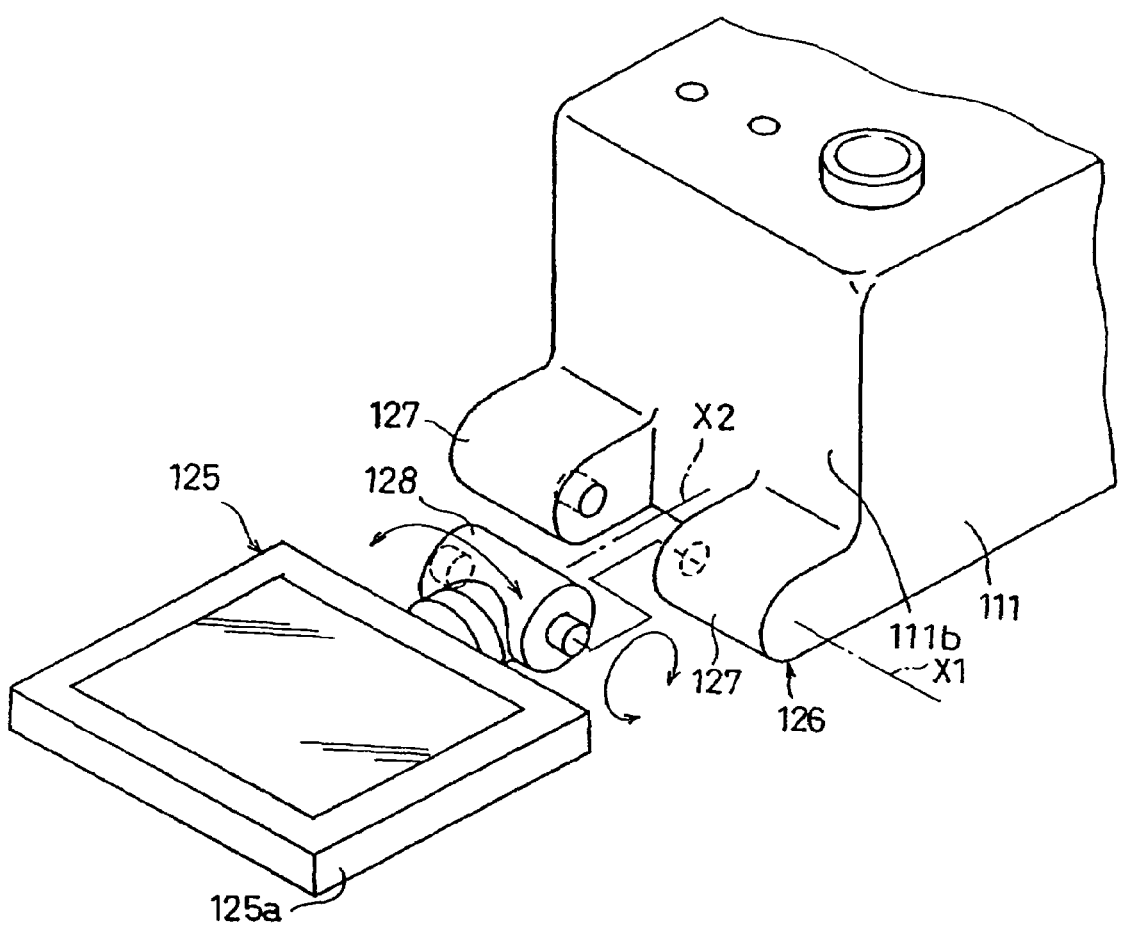
FIG. 19 is a rear view in perspective of another embodiment of the digital camera which is provided with an LCD monitor panel having a structure different from the structure of the LCD monitor panel of the digital camera shown in FIGS. 1 and 2.

It is possible to modify the structure of the LCD monitor panel 25 in the above illustrated embodiment of the digital camera. FIG. 19 shows another embodiment of the digital camera 10 which is provided with an LCD monitor panel 125 having a structure different from the structure of the LCD monitor panel 25 of the digital camera 10 shown in FIGS. 1 and 2. A hinge portion 126 (which corresponds to the hinge portion 26) which supports the LCD monitor panel 125 is formed not on an upper end portion of a rear end surface 111*b* (which corresponds to the rear end surface 11*b*) of a camera body 111 but on a lower end portion of the rear end surface 111*b*. Except for this positional difference, the structure of the hinge portion 126 is substantially the same as the structure of the hinge portion 26 in the previous embodiment of the digital camera. Specifically, a middle support arm 128 (which corresponds to the middle support arm 28) is held between a pair of support arms 127 (which corresponds to the pair of support arms 27) to be rotatable about an axis X1, while a rectangular frame portion 125*a* (which corresponds to the rectangular frame portion 25*a*) of the LCD monitor panel 125 is supported by the middle support arm 128 to be rotatable on an axis X2 orthogonal to the axis X1. The LCD monitor panel 125 is positioned along the rear end surface 111*b* of the camera body 111 when positioned in the retracted position, and can be rotated downwards to be positioned horizontally relative to the camera body 11 as shown in FIG. 19. When the LCD monitor panel 125 is positioned as shown in FIG. 19, no portion of the LCD monitor panel 125 projects past a top surface 111*c* (which corresponds to the top surface 11*c*) of the camera body 111, which makes it easier for the user to operate various manual operational members provided on the top surface 111*c*. Although FIG. 19 shows a state in which the LCD monitor panel 125 is rotated downwards by approximately 90 degrees from the retracted position, the LCD monitor panel 125 can further be rotated downwards beyond the position shown in FIG. 19, i.e., the maximum angle of rotation of the LCD monitor panel 125 can be over 90 degrees.

Obvious changes may be made in the specific embodiments of the present invention described herein, such modifications being within the spirit and scope of the invention claimed. It is indicated that all matter contained herein is illustrative and does not limit the scope of the present invention. For instance, although the optical axis of the photographing optical system is totally straight in the above illustrated embodiment of the digital camera, the present invention can be applied to a digital camera including a photographing optical system the optical axis of which is bent.

Although the grip is mounted to a right side surface of the camera body for right-handed users in each of the above illustrated embodiments, it will be easily understood by those skilled in the art that the grip can be mounted to a left side surface of the camera body for left-handed users.

What is claimed is:

1. A digital camera capable of selectively taking still images and moving images, comprising:
   a camera body including a photographing optical system;
   a grip mounted to said camera body to be rotatable relative to said camera body;
   a first manual operational member, positioned on a first straight line, and adopted for making said digital camera take said still images; and
   a second manual operational member, positioned on a second straight line which is substantially symmetrical with the first straight line relative to a third straight line that extends between said first manual operational member and said second manual operational member in a lengthwise direction of said grip, and adopted for making said digital camera take said moving images, wherein said grip includes two adjacent non-parallel surfaces, neither of which faces said camera body, said first manual operational member and said second manual operational member being provided on one and the other of said two adjacent non-parallel surfaces, respectively, and wherein an angle of inclination of said first manual operational member relative to said third straight line is substantially equal to an angle of inclination of said second manual operational member relative to said third straight line.

2. The digital camera according to claim 1, wherein said grip further comprises:

a plurality of surfaces including said two adjacent non-parallel surfaces, extending substantially parallel to a rotational axis of said grip, and surrounding said rotational axis.

3. The digital camera according to claim 1, wherein said two adjacent non-parallel surfaces are non-orthogonal to each other.

4. The digital camera according to claim 1, wherein said grip comprises three pairs of flat surfaces; and wherein one of said two adjacent non-parallel surfaces, on which one of said first manual operational member and said second manual operational member is provided, is non-parallel to each flat surface of said three pairs of flat surfaces.

5. The digital camera according to claim 1, wherein said at least one of said two adjacent non-parallel surfaces, on which one of said first manual operational member and said second manual operational member is provided, is formed as a non-flat surface.

6. The digital camera according to claim 5, wherein said non-flat surface has an external positive curvature.

7. The digital camera according to claim 1, wherein said grip is elongated in a direction orthogonal to a rotational axis of said grip, wherein said rotational axis is positioned eccentric to a center of said grip in a lengthwise direction of said grip, and wherein said first manual operational member and said second manual operational member are positioned in a vicinity of said rotational axis.

8. The digital camera according to claim 7, wherein one of said two adjacent non-parallel surfaces, on which one of said first manual operational member and said second manual operational member is provided, is positioned closer to said rotational axis than the other of said two adjacent nonparallel surfaces.

9. The digital camera according to claim 7, wherein said first manual operational member and said second manual operational member are positioned substantially on an imaginary cylindrical surface about said rotational axis.

10. The digital camera according to claim 8, wherein said grip comprises a battery chamber, an insertion opening of which is positioned at one end of opposite ends of said grip in said lengthwise direction of said grip, and wherein said first manual operational member and said second manual operational member are provided at the other end of said opposite ends of said grip in said lengthwise direction of said grip.

11. The digital camera according to claim 1, wherein an optical axis of said photographing optical system extends linearly in a direction from a front end to a rear end of said camera body, and wherein a rotational axis of said grip extends in a direction substantially orthogonal to said optical axis.

12. The digital camera according to claim 1, wherein said camera body comprises a right side surface, a left side surface, a top surface, and a bottom surface, which surround said photographing optical system, and wherein said grip is mounted to one of said right side surface and said left side surface to be rotatable relative to said camera body.

13. The digital camera according to claim 1, wherein said grip can be rotated relative to said camera body to orient at least one of said first manual operational member and said second manual operational member toward the front of said camera body.

14. The digital camera according to claim 1, further comprising:

a zoom switch positioned on said grip in association with said first manual operational member.

15. The digital camera according to claim 1, wherein said grip is pivoted about a pivot shaft which extends from a side surface of said camera body at a position on said side surface in a vicinity of a rear end of said camera body.

16. The digital camera according to claim 1, wherein said grip can be rotated to a specific angular position relative to said camera body so that a lengthwise direction of said grip is substantially coincident with a lengthwise direction of said camera body.

17. The digital camera according to claim 1, further comprising:

an image display portion mounted to a rear end of said camera body to be rotatable relative to said camera body.

18. The digital camera according to claim 1, wherein the angle of inclination of said first manual operational member relative to the third straight line is between 15° to 75°, and wherein the angle of inclination of said second manual operational member relative to the third straight line is between 15° to 75°.

19. A digital camera comprising:

a camera body including a photographing optical system;

a grip mounted to said camera body to be rotatable about a rotational axis extending in a direction substantially orthogonal to an optical axis of said photographing optical system;

a first manual operational member, positioned on a first straight line, and adopted for making said digital camera take still images when depressed; and a second manual operational member, positioned on a second straight line which is substantially symmetrical with the first straight line relative to a third straight line that extends between said first manual operational member and said second manual operational member in a lengthwise direction of said grip, and adopted for making said digital camera take moving images when depressed, wherein said grip includes two non-parallel surfaces which face radially outwards from said rotational axis in two different radial directions, respectively, said first manual operational member and said second manual operational member being provided on one and the other of said two adjacent non-parallel surfaces, respectively, and wherein an angle of inclination of said first manual operational member relative to said third straight line is substantially equal to an angle of inclination of said second manual operational member relative to said third straight line.

20. The digital camera according to claim 19,
wherein the angle of inclination of said first manual operational member relative to the third straight line is between 15° to 75°, and
wherein the angle of inclination of said second manual operational member relative to the third straight line is between 15° to 75°.

21. A digital camera comprising:
a camera body including a photographing optical system;
a grip mounted to said camera body to be rotatable about a rotational axis extending in a direction substantially orthogonal to an optical axis of said photographing optical system;
a first manual operational member adopted for making said digital camera take still images when depressed; and
a second manual operational member adopted for making said digital camera take moving images when depressed,
wherein said grip includes two non-parallel surfaces which face radially outwards from said rotational axis in two different radial directions, respectively, said first manual operational member and said second manual operational member being provided on one and the other of said two adjacent non-parallel surfaces, respectively,
wherein said grip is elongated in a direction orthogonal to a rotational axis of said grip,
wherein said rotational axis is positioned eccentric to a center of said grip in a lengthwise direction of said grip, and
wherein said first manual operational member and said second manual operational member are positioned in a vicinity of said rotational axis.

22. A digital camera capable of selectively taking still images and moving images, comprising:
a camera body including a photographing optical system;
a grip mounted to said camera body to be rotatable relative to said camera body;
a first manual operational member adopted for making said digital camera take said still images; and
a second manual operational member adopted for making said digital camera take said moving images,
wherein said grip includes two adjacent non-parallel surfaces, neither of which faces said camera body, said first manual operational member and said second manual operational member being provided on one and the other of said two adjacent non-parallel surfaces, respectively,
wherein said grip is elongated in a direction orthogonal to a rotational axis of said grip,
wherein said rotational axis is positioned eccentric to a center of said grip in a lengthwise direction of said grip, and
wherein said first manual operational member and said second manual operational member are positioned in a vicinity of said rotational axis.

* * * * *